J. W. BANKS.
CAKE KNOCKER FOR OIL MILLS.
APPLICATION FILED NOV. 14, 1912.

1,109,954.

Patented Sept. 8, 1914.

Witnesses:
C. F. Wesson
C. J. Hartnett

Inventor
J. W. Banks.
by attorneys
Southgate & Southgate

UNITED STATES PATENT OFFICE.

JOHN W. BANKS, OF TORREON COAH, MEXICO.

CAKE-KNOCKER FOR OIL-MILLS.

1,109,954.  Specification of Letters Patent.  Patented Sept. 8, 1914.

Application filed November 14, 1912. Serial No. 731,360.

*To all whom it may concern:*

Be it known that I, JOHN W. BANKS, a citizen of the United States, residing at Torreon Coah, Mexico, have invented a new and useful Cake-Knocker for Oil-Mills, of which the following is a specification.

This invention relates to a device for loosening oil cakes from the boxes in which they are pressed in oil mills.

The principal objects of the invention are to provide an implement for this purpose consisting of a minimum number of parts, and those of a simple and inexpensive character, which will be capable of loosening the cakes from the sides of the boxes and which will be provided with a pounding device connected with the rest of the implement in such a way that it cannot readily be separated therefrom or displaced.

Figure 1:
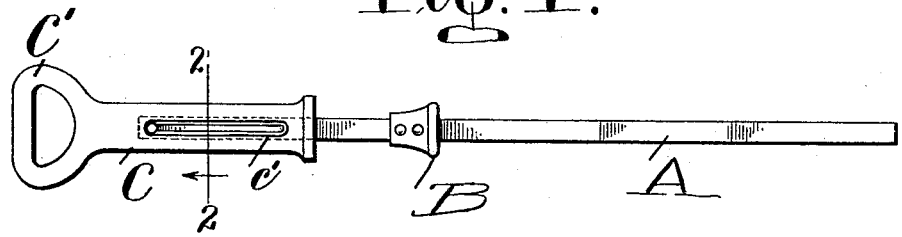
Figure 2:
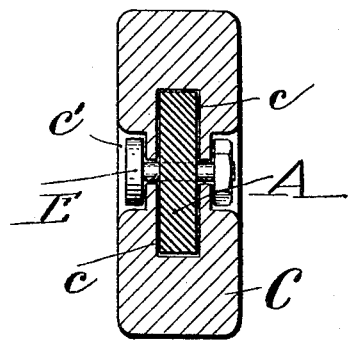

Reference is to be had to the accompanying drawings in which,

Figure 1 is a side view of a cake knocker constructed in accordance with this invention, and Fig. 2 is a transverse sectional view of the same on the line 2—2 of Fig. 1 on enlarged scale.

It is well known that the press cakes from which oil is extracted in presses often stick to the boxes in which they are pressed, and that this is a material source of expense in this art. So far as I am aware, only the most rudimentary devices have been devised for mitigating this evil, one of which is shown in the patent to Diffey, No. 468,302, patented February 2, 1892. This consisted merely in a blade which could be moved into the sides of the box to disengage the cake therefrom. Ordinarily it had to be hit with a hammer or some other implement and it did not accomplish the desired purpose in such a way as to materially lessen the cost of removing the press cakes. For the purpose of overcoming these difficulties this implement has been provided consisting of four pieces only. The main part is a blade A preferably of steel of approximately even thickness throughout its length and suitable for being forced between the sides of the boxes and the press cakes to loosen the sides of the cakes from the boxes. This is provided with a driving lug B preferably of brass riveted on the blade at a distance from the end and leaving a square shoulder to fit against the surface of an oil cake. Slidably mounted on the end of the blade opposite the operative end is a handle C. This also may be made of brass and is provided with ways $c$ through which the end of the blade passes. These serve as a guide for the handle to enable it to be moved along the blade. On the blade also is a bolt or stud E and the handle is provided with a slot $c'$ for receiving the same. The handle has a hand grip $C'$ on the end beyond the end of the blade in its innermost portion.

In operation the stripper portion of the blade which is the part opposite the handle portion, is forced between the sides of the press boxes between the same and the cakes to part them. This operation can be performed by controlling the device from the handle alone. By manipulating the handle the edge of the blade can be brought into any desired position for accomplishing this purpose. The blade is forced far enough in to cause the lug B to come firmly against the end of the cake and then the handle is moved longitudinally along the blade to cause the metal at the end of the slot $c'$ to hit against the stud E and thus transmit the blow to the blade and to the lug B which thus transmits it to the cake. In this way a very slight blow is sufficient to loosen the cake and permit it to be removed. It will be observed that the lug B projects from one side of the flat blade A, so that it may pass down into the box without engaging the side wall thereof during the act of pressing or knocking out the cake, and in order that it may thus pass down into the box a suitable distance, it must be located on the blade at a distance from the jarring member C.

It will be seen that the cake is removed by a very simple operation and without the use of any loose tools which are likely to become separated and lost. The stud E working in the slot prevents the handle from being removed from the blade. It will be understood, of course, that the handle is relatively large and heavy so that blows can be delivered by it sufficiently to accomplish the above named objects.

Although I have illustrated and described only a single form in which the invention can be carried out, I am aware that many modifications can be made therein by any person skilled in the art without departing from the scope of the invention as expressed in the claims. Therefore, I do not wish to be limited to all the details herein shown and described, but What I do claim is,—

1. A cake knocker for oil mills, comprising a relatively thin stripper blade of approximately even thickness throughout its length and having a driving lug thereon adapted to contact with the edges of the oil cakes within the boxes in which they are formed, and means connected to said blade for jarring said driving lug to loosen the oil cakes from the boxes.

2. A cake knocker for oil mills, comprising a relatively thin blade of approximately even thickness throughout its length, a driving lug secured thereon intermediate its ends, the blade on opposite sides of said driving lug being adapted as a stripper blade and a handle support respectively, and a weighted handle mounted to slide on said handle portion and adapted to percussively engage said handle portion to transmit shocks to said driving lug.

In testimony whereof I have hereunto set my hand, in the presence of two subscribing witnesses.

JOHN W. BANKS.

Witnesses:
W. T. BOON,
MATEO GEIB.

---

Copies of this patent may be obtained for five cents each, by addressing the "Commissioner of Patents, Washington, D. C."